US012695199B2

(12) United States Patent
Suzuki et al.

(10) Patent No.: US 12,695,199 B2
(45) Date of Patent: Jul. 28, 2026

(54) ANTENNA DEVICE AND COMMUNICATION DEVICE

(71) Applicant: YOKOWO CO., LTD., Tokyo (JP)

(72) Inventors: Shunsuke Suzuki, Tomioka (JP); Bunpei Hara, Tomioka (JP); Noriyoshi Nakada, Tomioka (JP); Sadaharu Kizawa, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 128 days.

(21) Appl. No.: 18/708,408

(22) PCT Filed: Oct. 19, 2022

(86) PCT No.: PCT/JP2022/038890
§ 371 (c)(1),
(2) Date: May 8, 2024

(87) PCT Pub. No.: WO2023/095495
PCT Pub. Date: Jun. 1, 2023

(65) Prior Publication Data
US 2025/0030168 A1 Jan. 23, 2025

(30) Foreign Application Priority Data
Nov. 25, 2021 (JP) ................................ 2021-190811

(51) Int. Cl.
*H01Q 9/32* (2006.01)
*H01Q 1/32* (2006.01)

(52) U.S. Cl.
CPC ................ *H01Q 9/32* (2013.01); *H01Q 1/32* (2013.01)

(58) Field of Classification Search
CPC .............. H01Q 1/32; H01Q 9/32; H01Q 1/38
See application file for complete search history.

(56) References Cited

U.S. PATENT DOCUMENTS 11,191,161 B2 11/2021 Koide et al.
11,271,293 B2 3/2022 Yoshioka
11,677,144 B1 * 6/2023 Lafleur ................. H01Q 21/26 343/878
2016/0204824 A1 * 7/2016 Mochizuki ............... H04B 1/48 343/702
2019/0219896 A1 * 7/2019 Okano .................. G03B 15/05
2019/0371578 A1 * 12/2019 Larosa .............. H01L 21/67109
2020/0052404 A1 * 2/2020 Eid .................. H01L 23/49541
2020/0359498 A1 11/2020 Koide et al.
2020/0388909 A1 12/2020 Yoshioka
(Continued)

FOREIGN PATENT DOCUMENTS

EP 1641074 A1 3/2006
JP 2004-228913 A 8/2004
(Continued)

OTHER PUBLICATIONS

Dec. 27, 2022, International Search Opinion issued for related PCT Application No. PCT/JP2022/038890.
(Continued)

*Primary Examiner* — Thien M Le
(74) *Attorney, Agent, or Firm* — Paratus Law Group, PLLC

(57) ABSTRACT

An antenna device including a substrate; and an antenna element at least partially connected to the substrate by reflow soldering.

13 Claims, 13 Drawing Sheets

(56) References Cited

U.S. PATENT DOCUMENTS

| | | | | |
|---|---|---|---|---|
| 2022/0263222 | A1* | 8/2022 | Kamphuis | H01Q 1/523 |
| 2023/0110307 | A1* | 4/2023 | Michelsen | H05B 3/28 219/544 |
| 2024/0188266 | A1* | 6/2024 | King | H05K 9/0032 |
| 2025/0022816 | A1* | 1/2025 | Nemoto | H01L 25/18 |
| 2025/0316520 | A1* | 10/2025 | Li | H01J 37/32715 |

FOREIGN PATENT DOCUMENTS

| | | | |
|---|---|---|---|
| JP | 2004-304496 | A | 10/2004 |
| JP | 2006-101467 | A | 4/2006 |
| JP | 2008-071997 | A | 3/2008 |
| JP | 2015-149409 | A | 8/2015 |
| JP | 2019-134081 | A | 8/2019 |
| JP | 2020-198593 | A | 12/2020 |

OTHER PUBLICATIONS

Apr. 7, 2026, Japanese Office Action issued for related JP Application No. 2023-563558.

* cited by examiner

ANTENNA DEVICE AND COMMUNICATION DEVICE

CROSS REFERENCE TO PRIOR APPLICATION

This application is a National Stage Patent Application of PCT International Patent Application No. PCT/JP2022/038890 (filed on Oct. 19, 2022) under 35 U.S.C. § 371, which claims priority to Japanese Patent Application No. 2021-190811 (filed on Nov. 25, 2021), which are all hereby incorporated by reference in their entirety.

TECHNICAL FIELD

The present invention relates to an antenna device and a communication device.

BACKGROUND ART

In recent years, various antenna devices have been developed as vehicle-to-everything (V2X) antenna devices. Patent Document 1 discloses an example of a V2X antenna device. The antenna device includes a dipole antenna. The dipole antenna is configured by a conductor pattern provided on an antenna substrate. The antenna substrate stands substantially perpendicular to a printed circuit board (PCB) by a holder. The holder is fixed to the PCB by a screw.

RELATED DOCUMENT

Patent Document

Patent Document 1: Japanese Unexamined Patent Publication No. 2020-198593

SUMMARY OF THE INVENTION

Technical Problem

For example, as described in Patent Document 1, there is a case where an antenna element is formed by a conductor pattern provided on an antenna substrate. In this case, the antenna element may be connected to a substrate such as a PCB by hand soldering. Alternatively, an antenna element may be formed by a conductor such as a metal plate or a coil. In this case, the antenna element may be connected to a substrate such as a PCB by hand soldering. The antenna element connected to the substrate by hand soldering, however, may relatively destabilize the quality of the connection between the substrate and the antenna element.

An example of an object of the present invention is to stabilize the quality of the connection between the substrate and the antenna element. Another object of the present invention will become apparent from the description of the present specification.

Solution to Problem

An aspect of the present invention is an antenna device including a substrate, and an antenna element at least partially connected to the substrate by reflow soldering.

An aspect of the present invention is a communication device including the antenna device, and an element at least partially connected to the substrate and processing a signal transmitted and received by the antenna device.

According to the above aspect of the present invention, the quality of the connection between the substrate and the antenna element can be stabilized.

DESCRIPTION OF EMBODIMENTS

Hereinafter, embodiments of the present invention will be described with reference to the drawings. In all drawings, the same constituent components are denoted by the same reference signs, and detailed explanation thereof will not be repeated.

In the present specification, ordinal numbers, such as "first", "second", and "third", are attached only for distinguishing components to which the same names are attached unless otherwise specified, and do not mean particular features (for example, an order or a degree of importance) of the components.

Embodiment 1

Figure 1:
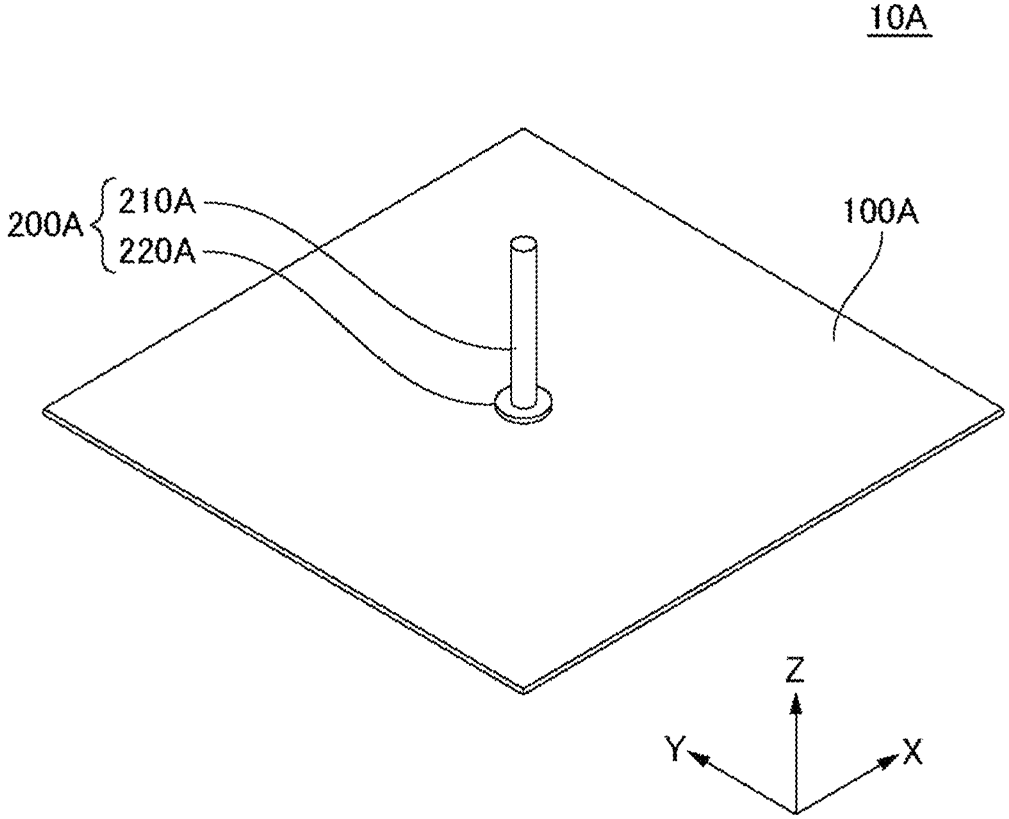
FIG. 1 A perspective view of an antenna device according to Embodiment 1.
Figure 2:
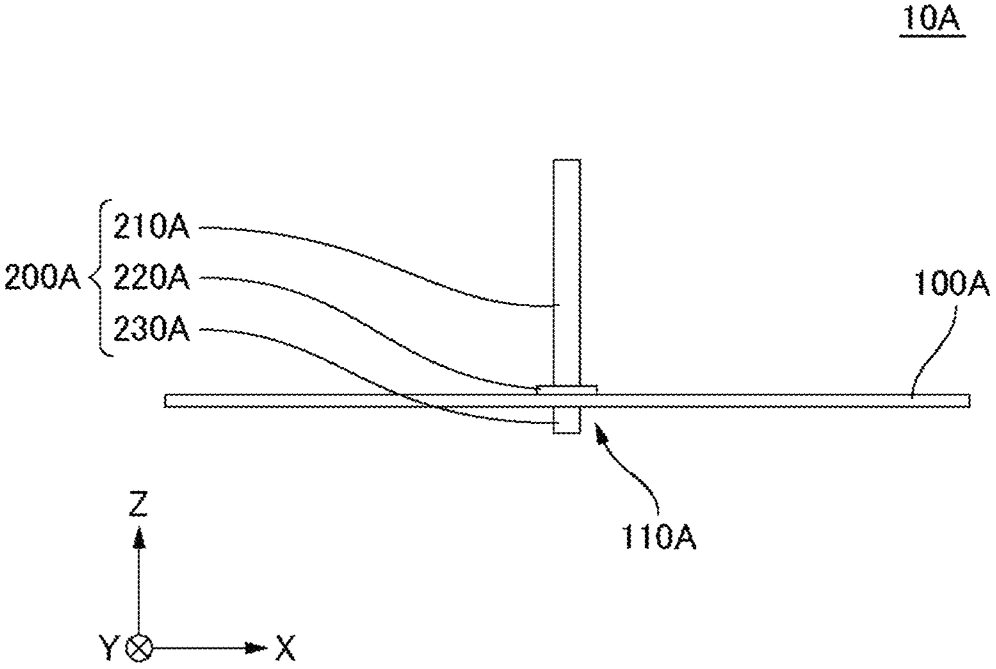
FIG. 2 A side view of the antenna device according to Embodiment 1.

FIG. 1 is a perspective view of an antenna device 10A according to Embodiment 1. FIG. 2 is a side view of the antenna device 10A according to Embodiment 1.

In FIG. 1, an arrow indicating a first direction X, a second direction Y, or a third direction Z indicates that a direction from a base end to a tip end of the arrow is a positive direction of a direction indicated by the arrow, and a direction from the tip end to the base end of the arrow is a negative direction of the direction indicated by the arrow. In FIG. 2, an X-marked white circle indicating the second direction Y indicates that a direction from the foreground to the background of the paper plane is a positive direction of the second direction Y and that a direction from the background to the foreground of the paper plane is a negative direction of the second direction Y.

The first direction X and the second direction Y are directions parallel to a horizontal direction perpendicular to a vertical direction. The first direction X and the second direction Y are orthogonal to each other. The third direction Z indicates a direction parallel to the vertical direction. Specifically, a positive direction of the third direction Z is a direction from a lower side to an upper side in the vertical direction. A negative direction of the third direction Z is a direction from the upper side to the lower side in the vertical direction. The relationships among the first direction X, the second direction Y, the third direction Z, the vertical direction, and the horizontal direction, however, are not limited to the above-described relationships. For example, the first direction X or the second direction Y may be parallel to the vertical direction.

The antenna device 10A includes a substrate 100A and an antenna element 200A. The antenna element 200A has a conductor 210A, a flange 220A, and a protrusion 230A.

The substrate 100A is a printed circuit board (PCB). The substrate 100A, however, may be a substrate other than a printed circuit board. The substrate 100A has a thickness direction substantially parallel to the third direction Z.

The antenna element 200A is a 5.9 GHz band vehicle-to-everything (V2X) antenna element. The used frequency band of the antenna element 200A, however, is not limited to the 5.9 GHz band and may be a frequency band higher than the 5.9 GHz band, such as a 7 GHz band. The antenna element 200A may be an antenna element for a use different from that of V2X.

The conductor 210A has a substantially linear shape standing substantially perpendicular to the substrate 100A. Specifically, the conductor 210A is a monopole antenna. The length of the conductor 210A in the third direction Z is relatively short when the used frequency band of the antenna element 200A is a relatively high frequency band. The shape of the conductor 210A, however, is not limited to the shape according to Embodiment 1, and may be, for example, a plate shape. The conductor 210A may be an antenna other than the monopole antenna. For example, the conductor 210A may be a dipole antenna.

The flange 220A is provided at an end portion of the conductor 210A on a negative direction side of the third direction Z. When viewed in the positive direction of the third direction Z, the flange 220A has a substantially annular shape surrounding an entire periphery of the end portion of the conductor 210A on the negative direction side of the third direction Z. The shape of the flange 220A, however, is not limited to this example. The surface of the flange 220A on the negative direction side of the third direction Z is substantially parallel to the surface of the substrate 100A on a positive direction side of the third direction Z. The width of the flange 220A in the direction perpendicular to the third direction Z is wider than the width of the conductor 210A in the direction perpendicular to the third direction Z. Thus, the flange 220A is at least a part of a pedestal provided on a side of the antenna element 200A where the substrate 100A is located. Accordingly, the conductor 210A can stably stand substantially perpendicular to the substrate 100A as compared with a case where the flange 220A is not provided.

In Embodiment 1, the flange 220A is at least a part of a pedestal that supports the conductor 210A substantially perpendicularly to the substrate 100A. A member other than the flange 220A, however, may be at least a part of the pedestal. For example, a plurality of protrusions extending from the conductor 210A in a predetermined direction may be provided when viewed from the positive direction of the third direction Z. In this example, the plurality of protrusions are at least a part of the pedestal. The pedestal may not be provided. For example, the flange 220A may not be provided.

The protrusion 230A extends from an end portion of the conductor 210A on the negative direction side of the third direction Z in the negative direction of the third direction Z. The protrusion 230A is inserted into a through-hole 110A provided in the substrate 100A in the third direction Z. Thus, the antenna element 200A is partially inserted into the through-hole 110A in the third direction Z. Accordingly, the antenna element 200A can be stably attached to the substrate 100A as compared with a case where the end portion of the conductor 210A on the negative direction side of the third direction Z is attached to the surface of the substrate 100A on the positive direction side of the third direction Z without the protrusion 230A being inserted into the through-hole 110A. In an example shown in FIG. 2, an end of the protrusion 230A in the negative direction of the third direction Z is located on the negative direction side of the third direction Z with respect to a surface of the substrate 100A on the negative direction side of the third direction Z. The end of the protrusion 230A in the negative direction of the third direction z, however, may be substantially aligned with the surface of the substrate 100A on the negative direction side of the third direction z. Alternatively, the end of the protrusion 230A in the negative direction of the third direction Z may be located on the positive direction side of the third direction Z with respect to the surface of the substrate 100A on the negative direction side of the third direction Z.

The antenna element 200A is at least partially connected to the substrate 100A by reflow soldering. Specifically, the antenna element 200A is mounted over the substrate 100A by pin-in-paste mounting.

An example of the pin-in-paste for mounting the antenna element 200A over the substrate 100A will be described.

First, the through-hole 110A is formed in the substrate 100A. Next, the through-hole 110A is filled with solder paste. Next, the protrusion 230A is passed through the through-hole 110A from the surface of the substrate 100A on the positive direction side of the third direction Z. Next, the solder paste is heated to a predetermined temperature to melt the solder paste. Thus, the protrusion 230A is fixed to the through-hole 110A by the solder paste with the conductor 210A standing substantially perpendicular to the substrate 100A.

In the pin-in-paste according to Embodiment 1, the antenna element 200A can be mounted over the substrate 100A by an automatic mounting device. Thus, it is not necessary to connect the antenna element 200A to the substrate 100A by hand soldering. Accordingly, the quality of the connection between the substrate 100A and the antenna element 200A can be stabilized as compared with a case where hand soldering is used. In addition, an amount of solder used for the connection between the substrate 100A and the antenna element 200A can be reduced as compared with a case where hand soldering is used. Furthermore, when it is necessary to mount a component over the substrate 100A, the number of steps in mass production can be reduced because the mounting of the antenna element 200A and the mounting of the component can be conducted in the same step.

In Embodiment 1, a holder that holds the antenna element 200A is not required. A screw that fixes the holder to the substrate 100A is also not required. Thus, assembly man-hours, the number of components, and cost of the antenna device 10A can be reduced as compared with a case where the holder and the screw are used.

Furthermore, when the above-mentioned screw is used to fix the holder to the substrate 100A, directivity of the antenna element 200A may be affected by the screw. On the other hand, In Embodiment 1, on the other hand, influence of the screw on the directivity of the antenna element 200A can be suppressed as compared with a case where the screw is used.

Figure 3:
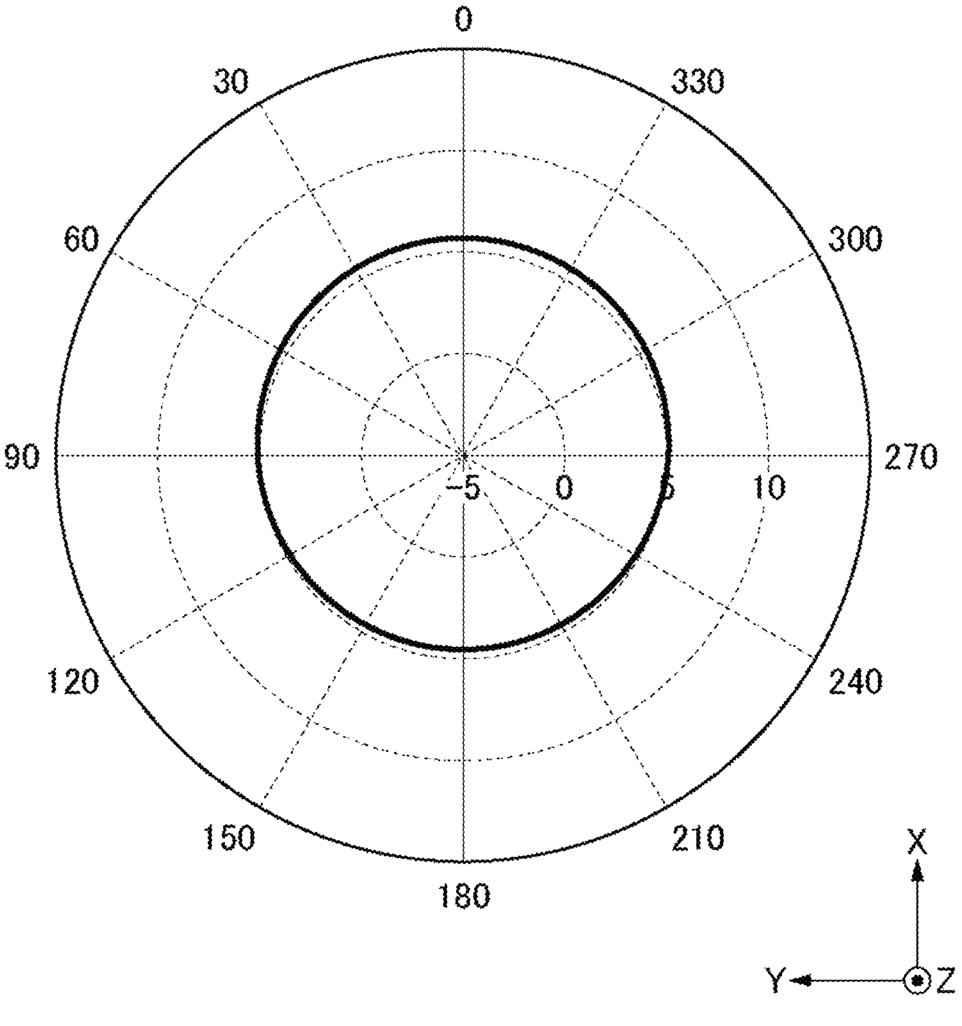
FIG. 3 A graph showing directivity of the antenna device according to Embodiment 1 at 5900 MHz and vertically polarized wave.

FIG. 3 is a graph showing the directivity of the antenna device 10A according to Embodiment 1 at 5900 MHz and vertically polarized wave.

In FIG. 3, the numbers attached to an outer periphery of the graph indicate a direction (unit: °) in a plane perpendicular to the third direction Z. In FIG. 3, broken-line circles shown concentrically with respect to a center of the graph indicate sensitivity (unit: dBi) of the antenna. In FIG. 3, a black-dotted white circle indicating the third direction Z indicates that a direction from the background to the foreground of the paper plane is the positive direction of the third direction Z and that a direction from the foreground to the background of the paper plane is the negative direction of the third direction. The same applies to FIG. 5 described later.

Simulation conditions of the antenna device 10A according to Embodiment 1 when calculating the graph shown in FIG. 3 are as follows.

The substrate 100A was a ground plate extending to infinity in the direction perpendicular to the third direction Z. The antenna element 200A was a monopole antenna. The conductor 210A stood perpendicular to the substrate 100A. The flange 220A was provided at an end portion of the conductor 210A on the negative direction side in the third direction Z. The protrusion 230A was inserted into the through-hole 110A in the third direction Z. The protrusion 230A was electrically connected to a feeding port via a microstrip line. The microstrip line is provided on the surface of the substrate 100A on the negative direction side of the third direction Z and extends from the through-hole 110A to a negative direction of the first direction X.

Figure 4:
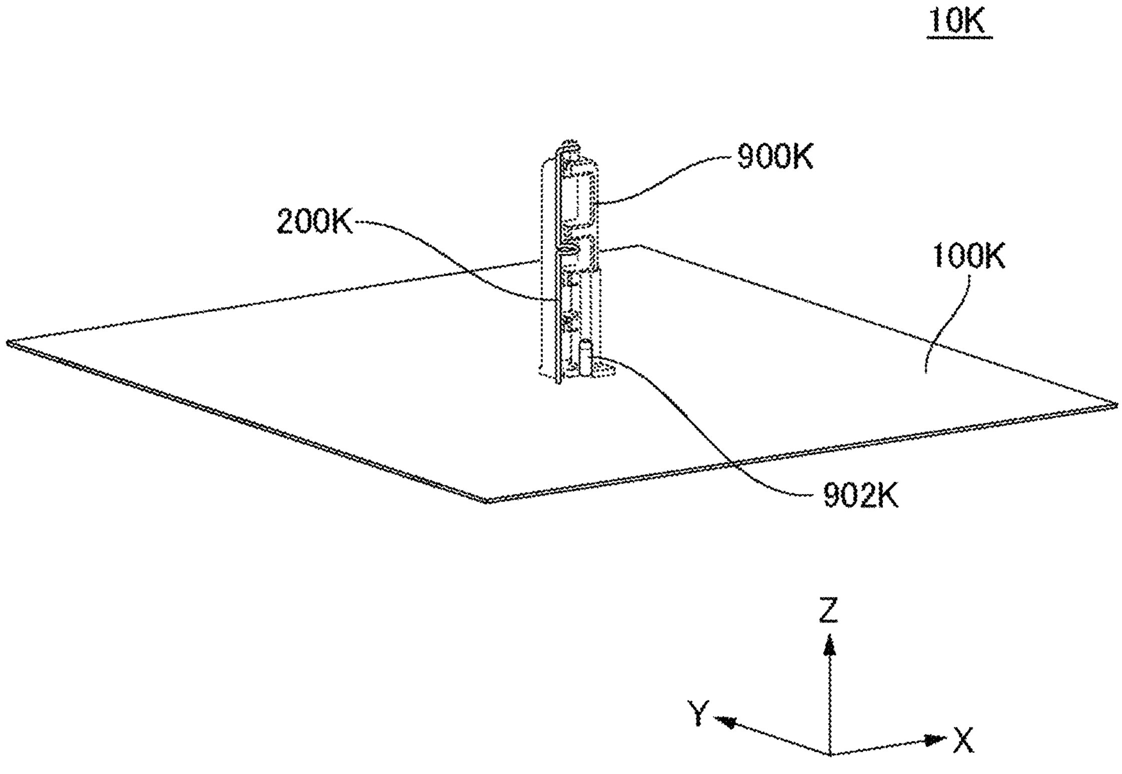
FIG. 4 A perspective view of an antenna device according to a comparative example.
Figure 5:
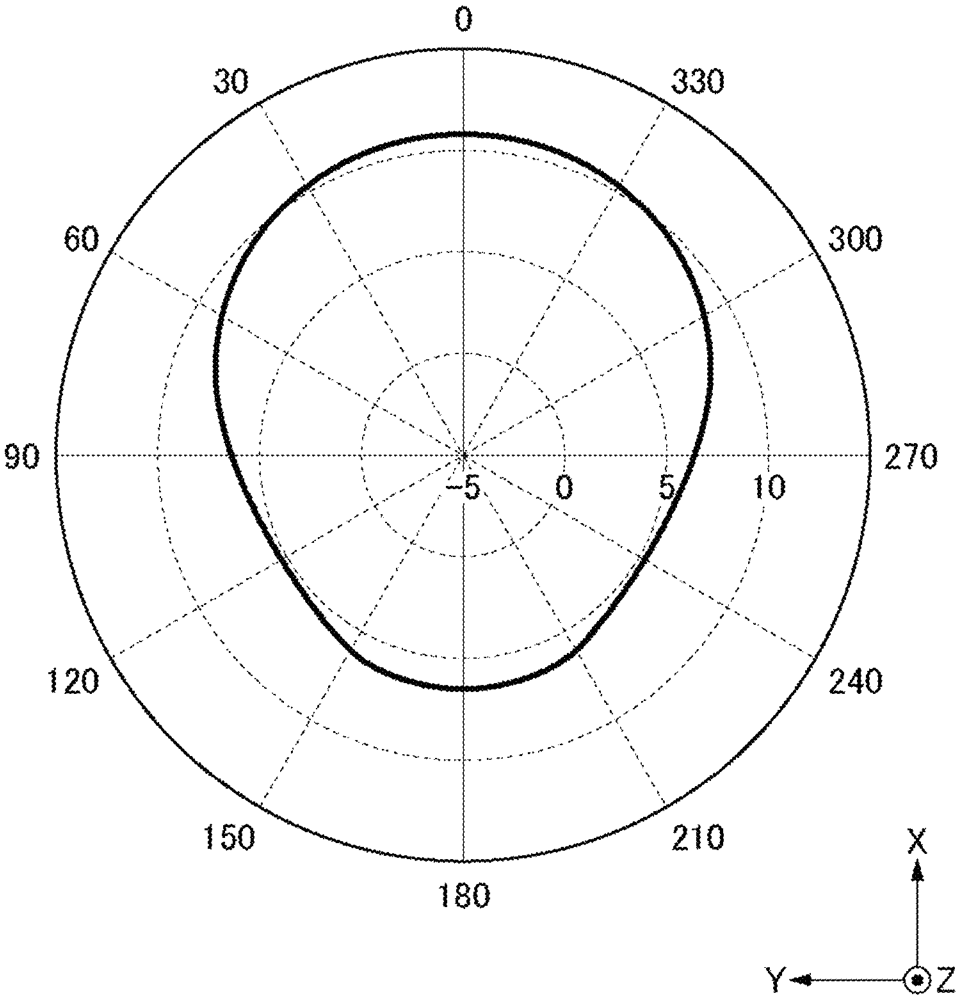
FIG. 5 A graph showing directivity of an antenna device according to a comparative example at 5900 MHz and vertically polarized wave.

FIG. 4 is a perspective view of an antenna device 10K according to a comparative example. FIG. 5 is a graph showing directivity of the antenna device 10K according to a comparative example at 5900 MHz and vertically polarized wave. Simulation conditions of the antenna device 10K according to the comparative example when calculating the graph shown in FIG. 5 were the same as the simulation of the antenna device 10A according to Embodiment 1 when calculating the graph shown in FIG. 3, except for the following points. In FIG. 3, for the sake of explanation, a holder 900K is illustrated as being transmitted.

In the antenna device 10K according to the comparative example, the antenna element 200K was a collinear array antenna. The antenna element 200K according to the comparative example stood perpendicular to the substrate 100K by the holder 900K. The holder 900K was fixed to the substrate 100K by a screw 902K provided on a surface side of the substrate 100K in the positive direction of the third direction Z. The screw 902K was located on a positive direction side of the first direction X of the antenna element 200K.

The directivity shown in FIG. 3 according to Embodiment 1 and the directivity shown in FIG. 5 according to the comparative example are compared.

As shown in FIG. 5, in the antenna device 10K according to the comparative example, sensitivity at 0° was about 11 dBi, and sensitivity at 180° was about 7 dBi. As shown in FIG. 3, in the antenna device 10A according to Embodiment 1, on the other hand, the sensitivity was about 5 dBi in all directions perpendicular to the third direction Z. That is, the antenna device 10A according to Embodiment 1 was almost omnidirectional. This result would be because the antenna device 10A according to Embodiment 1 is not provided with the holder that supports the antenna element 200A and the screw that fixes the holder to the substrate 100A.

In the antenna device 10A according to Embodiment 1, the sensitivity at 0° is slightly higher than the sensitivity at 180°. This is because the microstrip line according to Embodiment 1 extends from the through-hole 110A to the negative direction of the first direction X, and the feeding port according to Embodiment 1 is located on the negative direction side of the first direction X with respect to the through-hole 110A.

The sensitivity of the antenna device 10A according to Embodiment 1 is lower than the sensitivity of the antenna device 10K according to the comparative example. This is, however, simply because the antenna element 200A according to Embodiment 1 is a monopole antenna whereas the antenna element 200K according to the comparative example is a collinear array antenna. That is, types of the antennas are different between the antenna element 200A according to Embodiment 1 and the antenna element 200K according to the comparative example. Accordingly, the results shown in FIGS. 3 and 5 do not indicate that the pin-in-paste mounting according to Embodiment 1 degrades the directivity of the antenna element.

Embodiment 2

Figure 6:
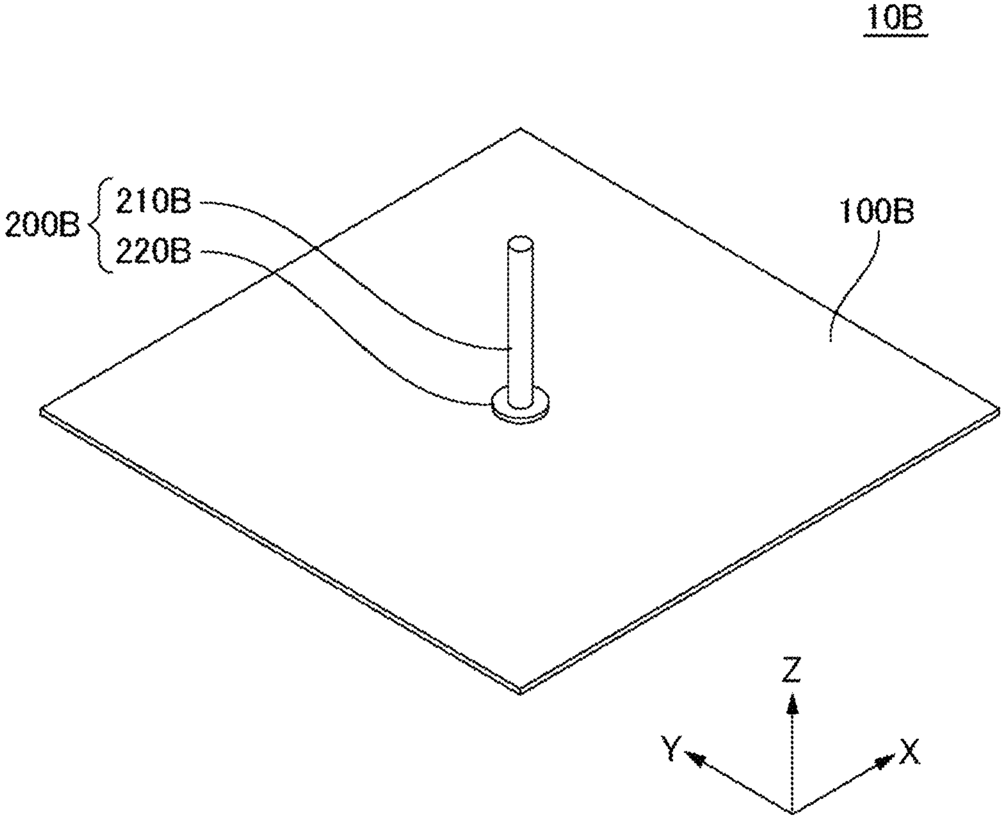
FIG. 6 A perspective view of an antenna device according to Embodiment 2.
Figure 7:
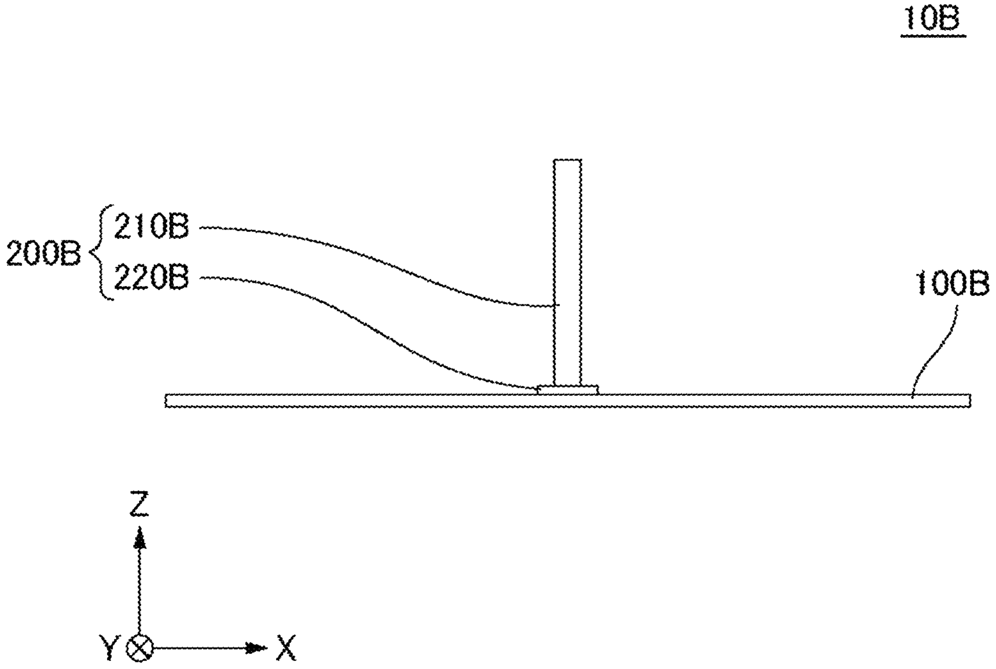
FIG. 7 A side view of the antenna device according to Embodiment 2.

FIG. 6 is a perspective view of an antenna device 10B according to Embodiment 2. FIG. 7 is a side view of the antenna device 10B according to Embodiment 2. The antenna device 10B according to Embodiment 2 is the same as the antenna device 10A according to Embodiment 1 except for the following points.

In Embodiment 2, an end portion of an antenna element 200B on the negative direction side of the third direction z is attached to a surface of a substrate 100B on the positive direction side of the third direction Z. Specifically, unlike the substrate 100A according to Embodiment 1, the substrate 100B according to Embodiment 2 is not provided with a through-hole. Unlike the antenna element 200A according to Embodiment 1, the antenna element 200B according to Embodiment 2 is not provided with a protrusion at an end portion of a conductor 210B on the negative direction side of the third direction Z. The antenna element 200B according to Embodiment 2 has a flange 220B in the same manner as the antenna element 200A according to Embodiment 1.

The antenna element 200B is at least partially connected to the substrate 100B by reflow soldering. Specifically, the antenna element 200B is mounted over the substrate 100B by surface mount technology (SMT).

An example of the SMT for mounting the antenna element 200B over the substrate 100B will be described.

First, solder paste is applied to a portion of the surface of the substrate 100B on the positive direction side in the third direction Z where the antenna element 200B is to be provided. Next, an end portion of the conductor 210B on the negative direction side of the third direction Z and a surface of the flange 220B on the negative direction side of the third direction Z are brought into contact with the solder paste, and the conductor 210B is stood substantially perpendicular to the substrate 100B via the solder paste. Next, the solder paste is heated to a predetermined temperature to melt the solder paste. Thus, the end portion of the conductor 210B on the negative direction side of the third direction Z and the surface of the flange 220B on the negative direction side of the third direction Z are fixed to the surface of the substrate 100B on the positive direction side of the third direction Z by the solder paste with the conductor 210B standing substantially perpendicular to the substrate 100B.

The solder paste may not be provided on both the end portion of the conductor 210B on the negative direction side of the third direction Z and the surface of the flange 220B on the negative direction side of the third direction Z. For example, the solder paste may be provided only on one of the end portion of the conductor 210B on the negative direction side of the third direction Z and the surface of the flange 220B on the negative direction side of the third direction Z.

Also in the SMT according to Embodiment 2, the antenna element 200B can be mounted over the substrate 100B by the automatic mounting device. Accordingly, the quality of the connection between the substrate 100B and the antenna element 200B can be stabilized in the same manner as the pin-in-paste according to Embodiment 1, as compared with a case where hand soldering is used. In addition, an amount of solder used for the connection between the substrate 100B and the antenna element 200B can be reduced as compared with a case where hand soldering is used. Furthermore, when it is necessary to mount a component over the substrate 100B, the number of steps in mass production can be reduced because the mounting of the antenna element 200B and the mounting of the component can be conducted in the same step.

Also in the SMT according to Embodiment 2, a holder that holds the antenna element 200B and a screw that fixes the holder to the substrate 100B are not required in the same manner as the pin-in-paste according to Embodiment 1.

Furthermore, in the SMT according to Embodiment 2, it is not necessary to provide a through-hole in the substrate 100B as compared with the pin-in-paste according to Embodiment 1. Accordingly, in the SMT according to Embodiment 2, man-hours for connecting the antenna element 200B to the substrate 100B can be reduced as compared with the pin-in-paste according to Embodiment 1.

Embodiment 3

Figure 8:
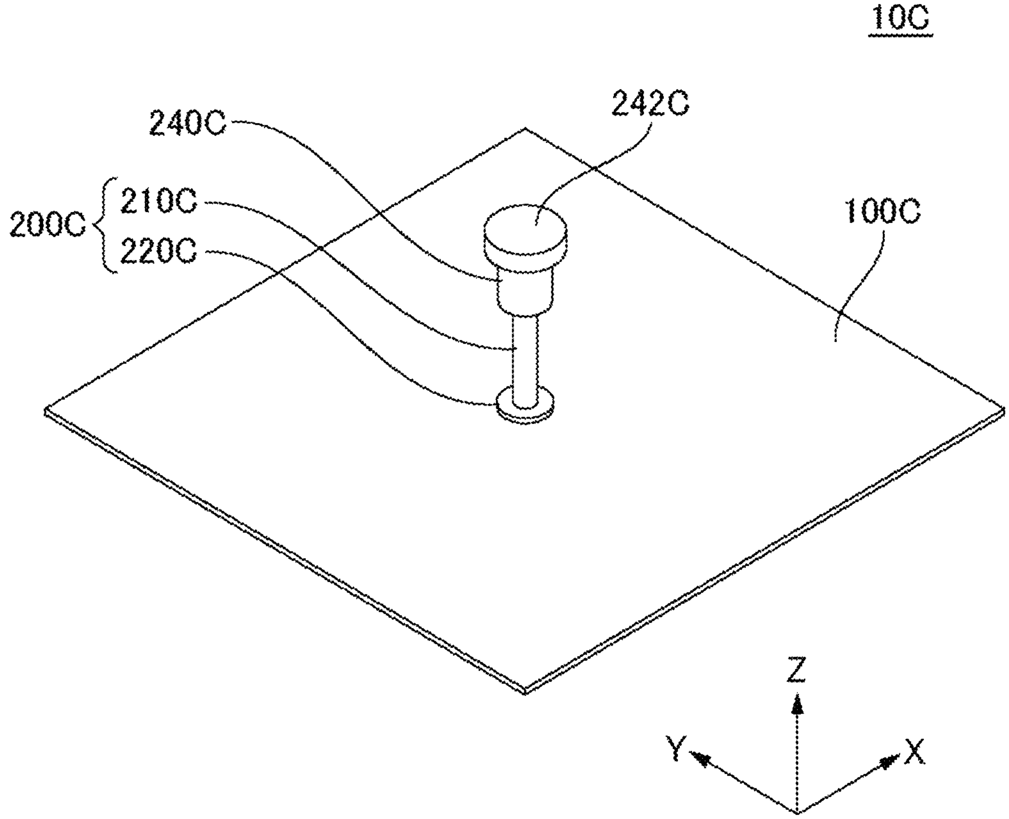
FIG. 8 A perspective view of an antenna device according to Embodiment 3.
Figure 9:
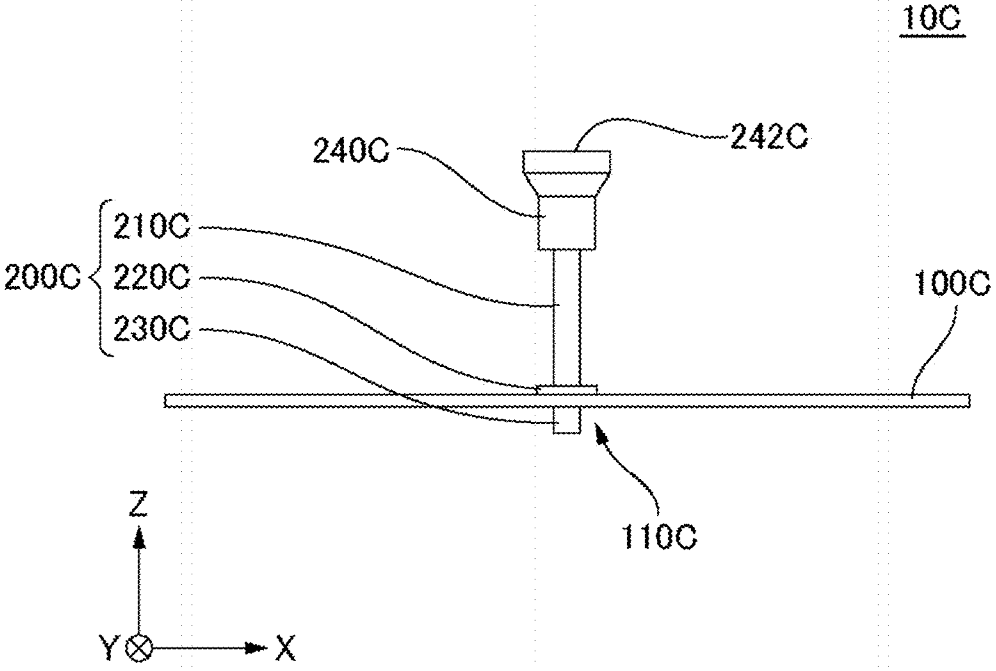
FIG. 9 A side view of the antenna device according to Embodiment 3.

FIG. 8 is a perspective view of an antenna device 10C according to Embodiment 3. FIG. 9 is a side view of the antenna device 10C according to Embodiment 3. The antenna device 10C according to Embodiment 3 is the same as the antenna device 10A according to Embodiment 1 except for the following points.

An antenna element 200C according to Embodiment 3 has a flange 220C in the same manner as the antenna element 200A according to Embodiment 1. The antenna element 200C according to Embodiment 3 has a protrusion 230C inserted into a through-hole 110C provided in a substrate 100C in the same manner as the antenna element 200A according to Embodiment 1. The protrusion 230C is fixed to the through-hole 110C by reflow soldering.

A cap 240C is provided at an end portion of the antenna element 200C according to Embodiment 3 on the positive direction side of the third direction Z. The cap 240C is a structure wider than a conductor 210C in the direction perpendicular to the third direction Z. The cap 240C is attachable to and detachable from, for example, an end portion of the conductor 210C on the positive direction side of the third direction Z. The cap 240C is made of an elastic material such as rubber. The cap 240C includes a first wide surface 242C of the cap 240C on the positive direction side of the third direction Z. The first wide surface 242C is substantially parallel to a surface of the substrate 100C on the positive direction side of the third direction Z. A width of the first wide surface 242C in the direction perpendicular to the third direction Z is wider than a width of the conductor 210C in the direction perpendicular to the third direction Z.

In Embodiment 3, the antenna element 200C is mounted over the substrate 100C by pin-in-paste mounting in the same manner as in Embodiment 1. In the pin-in-paste mounting in Embodiment 3, the antenna element 200C can be mounted over a surface side of the substrate 100C in the positive direction of the third direction Z while a not-shown suction nozzle is sucked to the first wide surface 242C. Accordingly, the antenna element 200C can be easily sucked to the suction nozzle as compared with a case where the first wide surface 242C is not provided.

The cap 240C according to Embodiment 3 can be applied not only to the pin-in-paste mounting but also to the SMT described in Embodiment 2. In the SMT, the antenna element 200C can be also easily sucked to the suction nozzle as compared with a case where the first wide surface 242C is not provided.

In Embodiment 3, it is not necessary to provide a special shape such as a structure 240D described later with reference to Embodiment 4 in the antenna element 200C, as compared with Embodiment 4 described later. Thus, in Embodiment 3, the antenna element 200C can be easily manufactured as compared with Embodiment 4.

Embodiment 4

Figure 10:
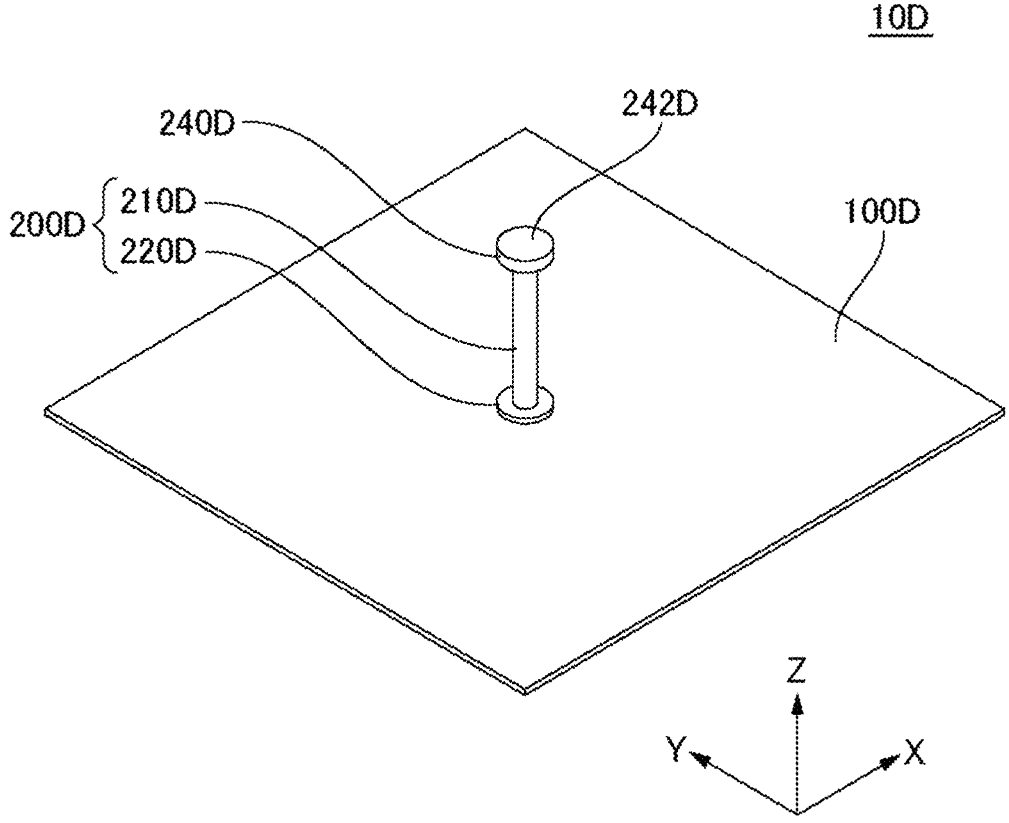
FIG. 10 A perspective view of an antenna device according to Embodiment 4.
Figure 11:
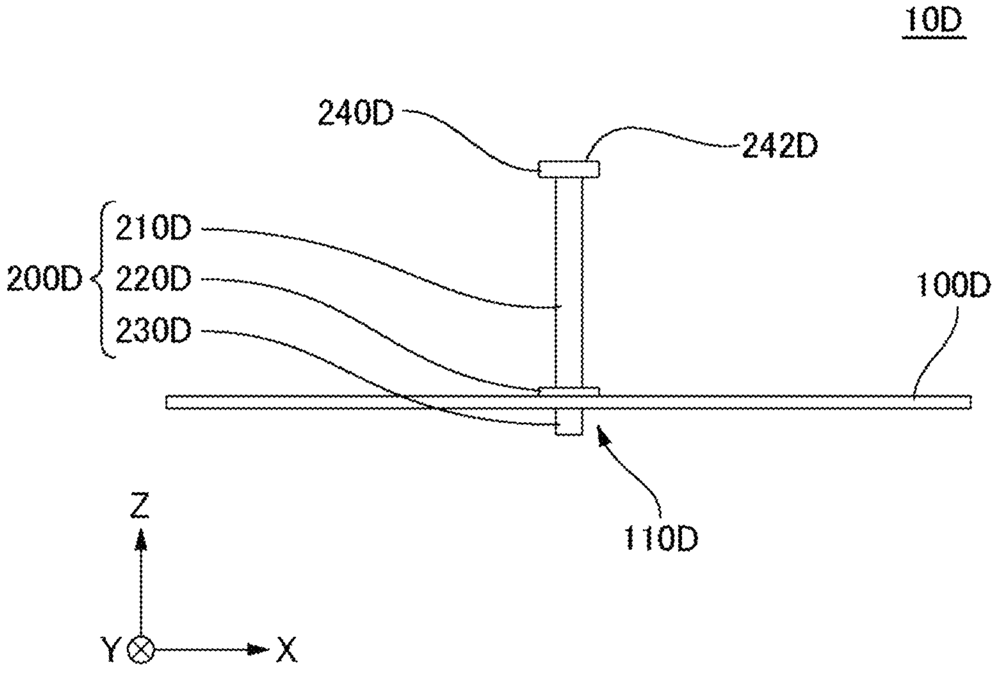
FIG. 11 A side view of the antenna device according to Embodiment 4.

FIG. 10 is a perspective view of an antenna device 10D according to Embodiment 4. FIG. 11 is a side view of the antenna device 10D according to Embodiment 4. The antenna device 10D according to Embodiment 4 is the same as the antenna device 10A according to Embodiment 1 except for the following points.

An antenna element 200D according to Embodiment 4 has a flange 220D in the same manner as the antenna element 200A according to Embodiment 1. The antenna element 200D according to Embodiment 4 has a protrusion 230D inserted into a through-hole 110D provided in a substrate 100D in the same manner as the antenna element 200A according to Embodiment 1. The protrusion 230D is fixed to the through-hole 110D by reflow soldering.

The structure 240D is provided at an end portion of the antenna element 200D according to Embodiment 4 on the positive direction side of the third direction Z. The structure 240D is wider than a conductor 210D in the direction perpendicular to the third direction Z. The structure 240D is integrated with, for example, an end portion of the conductor 210D on the positive direction side of the third direction Z. The structure 240D includes a second wide surface 242D of the structure 240D on the positive direction side of the third direction Z. The second wide surface 242D is substantially parallel to a surface of the substrate 100D on the positive direction side of the third direction Z. A width of the second wide surface 242D in the direction perpendicular to the third direction Z is wider than a width of the conductor 210D in the direction perpendicular to the third direction Z.

In Embodiment 4, in the mounting such as the pin-in-paste mounting, SMT, or the like, the antenna element 200D can be sucked to a suction nozzle in the same manner as Embodiment 3, as compared with a case where the second wide surface 242D is not provided.

In Embodiment 4, a step of attaching a cap to the antenna element 200D is not required as compared with Embodiment 3. In Embodiment 4, assembly man-hours of the antenna device 10D can be accordingly reduced as compared with Embodiment 3.

Embodiment 5

Figure 12:
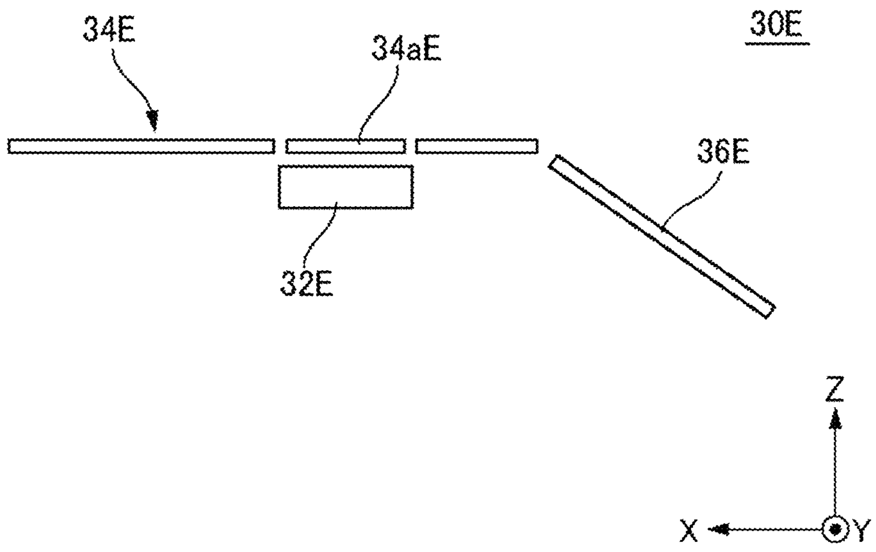
FIG. 12 A schematic view of a part of an automobile according to Embodiment 5.

FIG. 12 is a schematic view of a part of an automobile 30E according to Embodiment 5.

In FIG. 12, a black-dotted white circle indicating the second direction Y indicates that a direction from the background to the foreground of the paper plane is a positive direction of the second direction Y and that a direction from the foreground to the background of the paper plane is a negative direction of the second direction Y.

In FIG. 12, the positive direction of the first direction X is a front direction of the automobile 30E, and the negative direction of the first direction X is a rear direction of the automobile 30E. The positive direction of the second direction Y is a left direction of the automobile 30E when viewed from a rear side of the automobile 30E, and the negative direction of the second direction Y is a right direction of the automobile 30E when viewed from the rear side of the automobile 30E. The positive direction of the third direction Z is an upward direction of the automobile 30E, and the negative direction of the third direction Z is a downward direction of the automobile 30E.

The automobile 30E includes a housing 32E, a roof 34E, and a rear glass 36E. The housing 32E accommodates a communication device such as a communication device 20E described later with reference to FIG. 13, or a communication device 20F described later with reference to FIG. 14. Alternatively, the housing 32E may accommodate the antenna device described in Embodiments 1 to 4. The housing 32E is provided on a lower side of an attachment region 34*a*E of the roof 34E. The roof 34E is made of metal except for the attachment region 34*a*E. The attachment region 34*a*E is made of, for example, a dielectric such as resin or glass. When the attachment region 34*a*E is made of a dielectric, radio waves transmitted and received by the communication device accommodated in the housing 32E are more likely to pass through the attachment region 34*a*E as compared with a case where the attachment region 34*a*E is made of metal.

Figure 13:
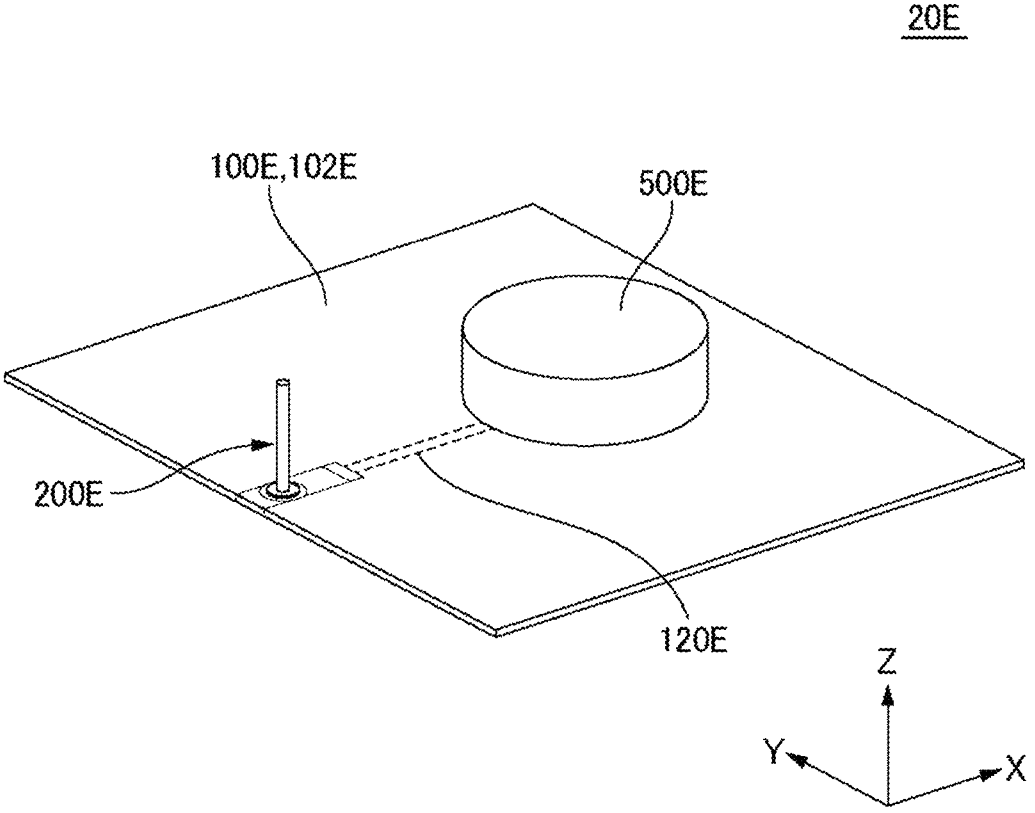
FIG. 13 A perspective view of a communication device according to Embodiment 5.

FIG. 13 is a perspective view of the communication device 20E according to Embodiment 5. The communication device 20E according to Embodiment 5 is the same as the antenna device 10A according to Embodiment 1 except for the following points.

The communication device 20E includes a substrate 100E, an antenna element 200E, and an element 500E.

The conductor pattern 102E is provided on an entire surface of the substrate 100E on the positive direction side of the third direction z. At least a part of the antenna element 200E and at least a part of the element 500E are provided on a surface side of the substrate 100E in the positive direction of the third direction Z. The antenna element 200E is electrically connected to the element 500E via a microstrip line 120E. The microstrip line 120E is provided, for example, on a surface side of the substrate 100E in the negative direction of the third direction Z.

The element 500E is, for example, a signal processing element such as an integrated circuit (IC). The element 500E processes a signal generated by radio waves transmitted and received by the antenna element 200E, for example. The element 500E, however, may be an element other than the above-described element. In an example shown in FIG. 13, the antenna element 200E is provided relatively close to the element 500E. Specifically, the element 500E is located on the positive direction side of the first direction X of the antenna element 200E. The element 500E shown in FIG. 13 is a schematic view. Accordingly, the element 500E shown in FIG. 13 does not suggest an actual size or shape of the element 500E.

The element 500E is connected to the substrate 100E by, for example, reflow soldering. In this case, a step of connecting the antenna element 200E to the substrate 100E by reflow soldering and a step of connecting the element 500E to the substrate 100E by reflow soldering can be performed by the same automatic mounting device. Accordingly, manufacture man-hours of the communication device 20E can be reduced as compared with a case where the step of connecting the antenna element 200E to the substrate 100E and the step of connecting the element 500E to the substrate 100E are separate steps.

The communication device 20E is accommodated in the housing 32E shown in FIG. 12. In this case, the communication device 20E may be accommodated in the housing 32E in the same orientation as an orientation shown in FIG. 13 or may be accommodated in the housing 32E in an orientation different from the orientation shown in FIG. 13. For example, when the communication device 20E is accommodated in the housing 32E in the same orientation as the orientation shown in FIG. 13, at least a part of the antenna element 200E and at least a part of the element 500E are located on an upward direction side of the automobile with respect to the substrate 100E, and the element 500E is located on a front direction side of the automobile with respect to the antenna element 200E. The element 500E, however, may be located in a direction perpendicular to the third direction Z and different from the direction shown in FIG. 13 with respect to the antenna element 200E. For example, the element 500E may be on a rear direction side, a left direction side, or a right direction side of the automobile with respect to the antenna element 200E. At least a part of the antenna element 200E and at least a part of the element 500E may be located on a downward direction side of the automobile with respect to the substrate 100E.

Figure 14:
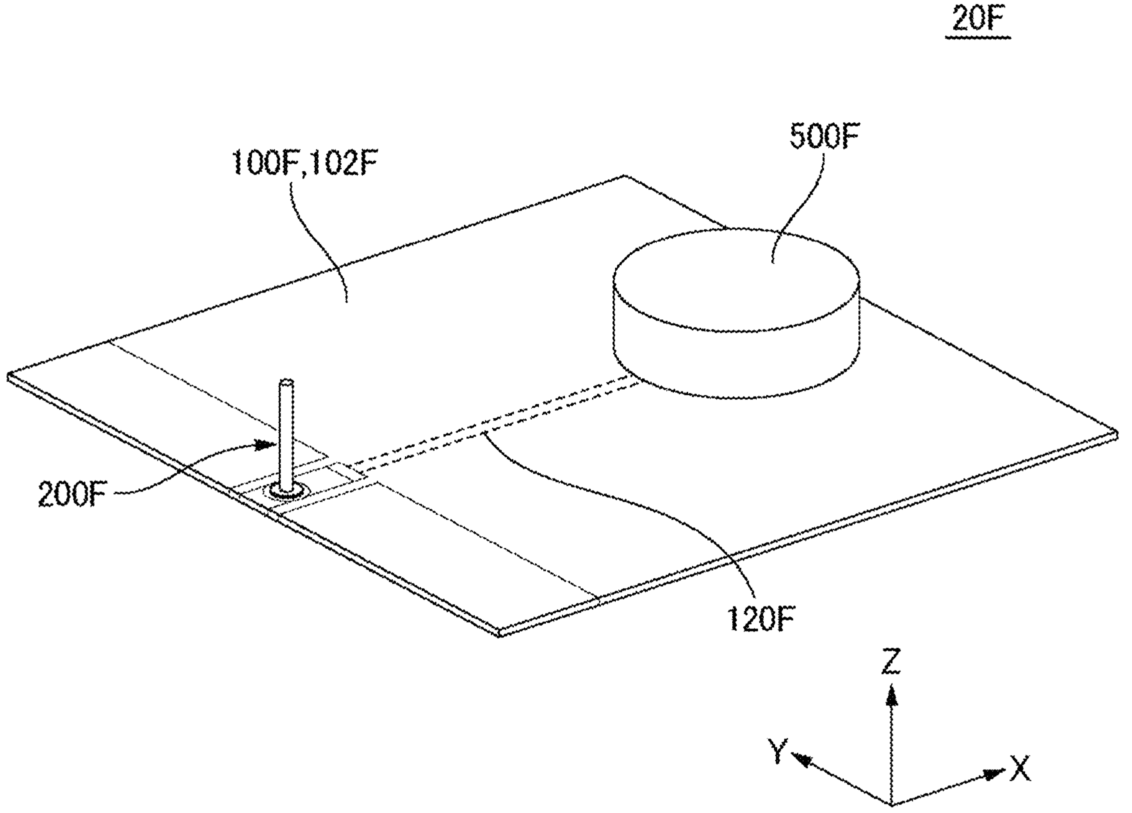
FIG. 14 A perspective view of a communication device according to a variant of FIG. 13.

FIG. 14 is a perspective view of the communication device 20F according to a variant of FIG. 13. The communication device 20F according to the variant is the same as the communication device 20E according to Embodiment 5 except for the following points.

The communication device 20F according to the variant includes a substrate 100F, an antenna element 200F, and an element 500F. The antenna element 200F and the element 500F according to the variant are electrically connected via a microstrip line 120F provided in the substrate 100F.

The element 500F according to the variant is provided at a location relatively far from the element 500F. For example, a distance between the antenna element 200F and the element 500F in the first direction X in an example shown in FIG. 14 is longer than a distance between the antenna element 200E and the element 500E in the first direction X shown in FIG. 13. In the example shown in FIG. 14, a conductor pattern 102F is not provided on opposite sides of the antenna element 200F in the second direction Y.

FIGS. 11 to 14 illustrate examples in which a communication device including an antenna device is accommodated in a housing provided on a lower side of a roof of an automobile. The location where the antenna device and the communication device are provided in the automobile, however, is not limited to this example. For example, the antenna device may be accommodated in an antenna case provided on an upper surface of the roof of the automobile.

The use of the antenna device and the communication device is not limited to the automobile. For example, the antenna device and the communication device may be installed in a vending machine, a ticket vending machine, a drone, or the like.

Embodiments of the present invention have been described with reference to the drawings above; however, these are merely examples of the present invention, and various configurations other than the above-described ones can also be adopted.

According to the present specification, the following aspects are provided.

Aspect 1

Aspect 1 is an antenna device including a substrate, and an antenna element at least partially connected to the substrate by reflow soldering.

According to Aspect 1, it is not necessary to connect the antenna element to the substrate by hand soldering. Accordingly, the quality of the connection between the substrate and the antenna element can be stabilized as compared with a case where a hand soldering is used. In addition, an amount of solder used for the connection between the substrate and the antenna element can be reduced as compared with a case where hand soldering is used. Furthermore, when it is necessary to mount a component over the substrate, the number of steps in mass production can be reduced because the mounting of the antenna element and the mounting of the mounting of the component can be conducted in the same step. According to Aspect 1, a holder that holds the antenna element and a screw that fixes the holder to the substrate are not required. Thus, assembly man-hours, the number of components, and cost of the antenna device can be reduced as compared with a case where the holder and the screw are used. In addition, influence of the screw on the directivity of the antenna element can be suppressed as compared with a case where the screw is used.

Aspect 2

Aspect 2 is the antenna device according to Aspect 1, in which the antenna element is partially inserted into a through-hole provided in the substrate.

According to Aspect 2, the antenna element can be stably attached to the substrate as compared with a case where the antenna element is attached to a surface of the substrate without the antenna element being partially inserted into the through-hole.

Aspect 3

Aspect 3 is the antenna device according to Aspect 1 or 2, in which a structure wider than the antenna element is provided in the antenna element.

According to Aspect 3, the antenna element can be mounted over the substrate while a suction nozzle is sucked to the structure. Accordingly, the antenna element can be easily sucked to the suction nozzle as compared with a case where the structure is not provided.

Aspect 4

Aspect 4 is the antenna device according to any one of Aspects 1 to 3, in which the antenna element has a pedestal provided on a side where the substrate is located.

According to Aspect 4, the antenna element can stably stand with respect to the substrate as compared with a case where the pedestal is not provided.

Aspect 5

Aspect 5 is a communication device including the antenna device according to any one of aspects 1 to 4; and an element at least partially connected to the substrate and processing a signal transmitted and received by the antenna device.

According to Aspect 5, a step of connecting the antenna element to the substrate and a step of connecting the element to the substrate can be performed by the same automatic mounting device. Accordingly, manufacture man-hours of the communication device can be reduced as compared with a case where the step of connecting the antenna element to the substrate and the step of connecting the element to the substrate are separate steps.

Aspect 6

Aspect 6 is the antenna device according to any one of Aspects 1 to 4, in which the antenna element is attached to a surface of the substrate.

According to Aspect 6, it is not necessary to provide a through-hole in the substrate. Accordingly, man-hours for connecting the antenna element to the substrate can be reduced as compared with a case where the through-hole is provided in the substrate.

Aspect 7

Aspect 7 is the antenna device according to any one of Aspects 1 to 4 and 6, in which the antenna element is a V2X antenna element.

According to Aspect 7, it is not necessary to connect the V2X antenna element to the substrate by hand soldering. In addition, a holder that holds the V2X antenna element and a screw that fixes the holder to the substrate are not required.

REFERENCE SIGNS LIST

10A, 10B, 10C, 10D, 10K antenna device, 20E, 20F communication device, 30E automobile, 32E housing, 34E roof, 34*a*E attachment region, 36E rear glass, 100A, 100B, 100C, 100D, 100E, 100F, 100K substrate, 102E, 102F conductor pattern, 110A, 110C, 110D through-hole, 120E, 120F microstrip line, 200A, 200B, 200C, 200D, 200E, 200F, 200K antenna element, 210A, 210B, 210C, 210D conductor, 220A, 220B, 220C, 220D flange, 230A, 230C, 230D protrusion, 240C cap, 240D structure, 242C first wide surface,

242D second wide surface, 500E, 500F element, 900K holder, 902K screw, X first direction, Y second direction, Z third direction

The invention claimed is:

1. An antenna device comprising:

a substrate; and an antenna element at least partially connected to the substrate by reflow soldering, the antenna element being configured as a monopole antenna, wherein the antenna element includes a pedestal that abuts the substrate.

2. The antenna device according to claim 1, wherein the antenna element is partially inserted into a through-hole provided in the substrate.

3. The antenna device according to claim 1, wherein a structure is provided at an end portion of the antenna element opposite the pedestal, wherein the structure is wider than a portion of the antenna element between the pedestal and the structure.

4. The antenna device according to claim 2, wherein a structure is provided at an end portion of the antenna element opposite the pedestal, wherein the structure is wider than a portion of the antenna element between the pedestal and the structure.

5. A communication device comprising:

the antenna device according to claim 1; and an element at least partially connected to the substrate and processing a signal transmitted and received by the antenna device.

6. The antenna device according to claim 1, wherein the pedestal is electrically conductive.

7. The antenna device according to claim 1, wherein the pedestal supports the antenna element substantially perpendicularly to the substrate.

8. The antenna device according to claim 3, wherein the structure is a separate member attached to the antenna element.

9. The antenna device according to claim 4, wherein the structure is a separate member attached to the antenna element.

10. The antenna device according to claim 1, wherein the pedestal is in physical contact with the substrate.

11. The antenna device according to claim 1, wherein the pedestal is in direct physical contact with the substrate.

12. The antenna device according to claim 1, wherein the pedestal includes a flange surrounding an entire periphery of an end portion of the antenna element.

13. The antenna device according to claim 12, wherein the flange has a substantially annular shape surrounding the entire periphery of the end portion of the antenna element.

* * * * *